W. T. GERMANY.
LACING NEEDLE.
APPLICATION FILED OCT. 26, 1908.
940,682.
Patented Nov. 23, 1909.
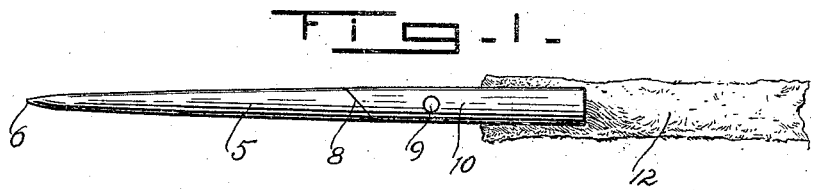
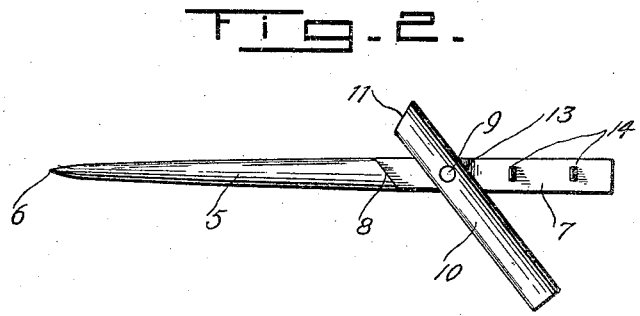
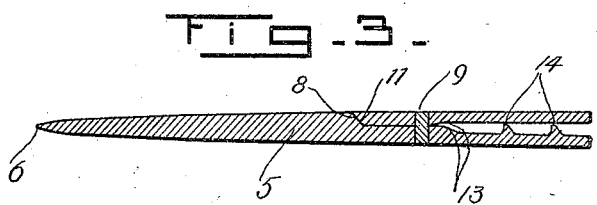
Witnesses
Inventor
W. T. GERMANY
By
Attorneys

UNITED STATES PATENT OFFICE.

WILLIE T. GERMANY, OF BOGUE CHITTO, MISSISSIPPI.

LACING-NEEDLE.

940,682.   Specification of Letters Patent.   Patented Nov. 23, 1909.

Application filed October 26, 1908. Serial No. 459,618.

*To all whom it may concern:*

Be it known that I, WILLIE T. GERMANY, a citizen of the United States, residing at Bogue Chitto, in the county of Lincoln, State of Mississippi, have invented certain new and useful Improvements in Lacing-Needles; and I do hereby declare the following to be a full, clear, and exact description of the invention, such as will enable others skilled in the art to which it appertains to make and use the same.

The invention relates to a lacing needle and more particularly to the class of belt lacing needles.

The primary object of the invention is the provision of a lacing needle comprising a shank which is elongated, the same being circular in cross section and gradually tapering from its rear end to a point at its forward end, the said shank containing a recess at one side at its rear end, and a pivoted section mounted in said recess and adapted to swing laterally in one direction sidewise to the axis of the shank and when said section is brought into alinement with the shank it is adapted to securely clamp one end of a lacing strip, cord or the like so that then the same can be readily and easily laced through holes or eyelets contained in belt ends to connect the same.

Another object of the invention is the provision of a lacing needle comprising a tapering pointed shank and a pivotal section thereon, said shank formed with spurs or projections disposed between it and the said pivotal section so as to clamp a lacing strip or the like for use in lacing or otherwise connecting the ends of a belt.

With these and other objects in view which will appear as the nature of the invention is better understood, the invention consists substantially in the novel construction, combination and arrangement of parts as will be hereinafter more fully described, illustrated in the accompanying drawings which disclose the preferred form of embodiment of the invention and pointed out in the appended claim.

In the drawings: Figure 1 is a side elevation of a lacing needle embodying the invention, a lacing strip being shown attached thereto. Fig. 2 is a similar view with the pivotal section swung in an open position and the lacing strip removed. Fig. 3 is a longitudinal sectional view.

Similar reference characters indicate corresponding parts throughout the several views in the drawings.

In the drawings, the numeral 5 designates the shank of the lacing needle herein described, which shank is elongated, substantially circular in cross section and gradually tapers from its rear end to a point at the forward end thereof, at which latter end the shank terminates in a penetrating point 6. The shank 5 at its rear end and at one of its sides is provided with a longitudinal recess 7 the depth of which is approximately one half of the diameter of the shank and the inner end of this recess terminates in a diagonally disposed wall or beveled extremity 8 the function of which will be hereinafter described.

At a distance removed from the beveled wall 8 of the shank 5 and secured in the latter is a pivot 9 connecting a swinging section 10 semi-circular in cross section to the said shank and which section is of a length corresponding to the recess 7 and has its inner end beveled as at 11 corresponding to the beveled wall 8 so as to abut thereagainst when the swinging section is swung into alinement with the longitudinal extent of the shank. The swinging section 10 is adapted to clamp one end of a lacing strip 12 to the shank by securing the strip between the inner faces of the said section and the recessed portion of the shank. The said inner faces of the swinging section 10 and recessed portion of the shank are cut away as at 13 to accommodate the thickness of the lacing strip and the same extend from the rear end of the shank to a point in close proximity to the pivot 9 connecting the swinging section thereto. Projecting from the cut away portion 13 of the recessed end of the shank 5 are biting spurs or projections 14 which latter are adapted to engage the lacing strip 12 when the swinging section 10 has been moved into alinement with the longitudinal extent of the shank so as to prevent positive slipping of the end of the lacing strip or its detachment from the needle.

It is obvious the beveled end 11 of the swinging section 10 and the beveled wall 8 limit the swinging movement of the said section 10 to bring the same in proper alinement with the shank 5 and also permit the said section to swing only in one direction for releasing the lacing strip.

What is claimed is—

A needle of the class described comprising a shank gradually tapering from one end to a point at the opposite end thereof, said shank containing a recess the inner end of which is formed with a beveled wall, a pivotal section connected to the shank within the recess and having a beveled inner end adapted to abut with the beveled wall of the recess, the pivotal section being adapted to swing in the plane of the face of the recess, and spurs projecting from the base of the recess and out of the path of movement of the pivotal section.

In testimony whereof, I affix my signature, in presence of two witnesses.

WILLIE T. GERMANY.

Witnesses:
  A. B. CONNALLY,
  A. J. SIMPSON.